United States Patent Office 3,259,585
Patented July 5, 1966

3,259,585
PROCESS FOR PREPARING STABILIZED ZIRCONIA SOLS
Frederick T. Fitch and Jean G. Smith, Baltimore, Md., assignors to W. R. Grace & Co., a corporation of Connecticut
No Drawing. Filed Aug. 14, 1963, Ser. No. 301,976
6 Claims. (Cl. 252—313)

This invention relates to a process for preparing stabilized zirconia sols. In one particular aspect, it relates to a process for preparing zirconia sols having particles which do not undergo the monoclinic-tetragonal transformation when the particles are sintered.

Zirconia has been of particular interest as a high refractory material for some time. Zirconia normally crystallizes in the monoclinic form and transforms reversibly to the tetragonal form at about 1000° C. This transformation is accompanied by a large volume change, reported to be about 9%. This characteristic precludes the use of unstabilized zirconia in ceramics. It is apparent that firing pure zirconia cannot produce coherent, strong pieces of sintered zirconia.

According to the prior art, zirconia can be stabilized by sintering zirconia powder with a suitable oxide. Addition of a few percent of such oxide, the exact amount depending on the particular oxide, will lower the monoclinic-tetragonal transformation to below room temperature. Addition of a larger amount of such oxide induces a permanent cubic structure in the resulting solution. A temperature of about 1400° C. is generally required to effect solid solution formation after the zirconia and stabilizing oxide powders are mixed.

We have discovered a method for preparing a zirconia sol composed of particles which are stabilized against the monoclinic-tetragonal phase transformation. Our method involves the direct incorporation of the stabilizing oxides into colloidal zirconia. This permits direct use of the stabilized reactive zirconia colloidal material in a variety of ceramic applications. The particles of such zirconia colloids are more reactive and sinter to high density at much lower temperatures than conventional stabilized zirconia powders. Where dispersion of the stabilized zirconia in a ceramic matrix is desired, the sol serves as an excellent vehicle for uniformly distributing the zirconia. On firing, ceramics of extremely high mechanical strength are obtained.

Briefly, our process comprises preparing sols in which a stabilizing oxide is intimately associated with the zirconia in the dispersed particles. In order to be effective, these oxides must have a cubic structure and a cation radius close to that of zirconium. Suitable oxides include scandia, yttria, and the oxides of the rare earth elements within the group samarium through lucetium, atomic numbers 62 through 71 of the periodic table.

The oxides stabilize by forming solid solutions with zirconia. The amount of oxide needed for stabilization varies slightly with the system. With yttria, for example, a few mole percent added to zirconia will bring the monoclinic-tetragonal transformation point below room temperature. Between 0 and 7 mole percent yttria, addition of progressively more yttria results in a steady decrease of the $c/a$ ratio of the tetragonal phase (which is only 1.017 for pure zirconia) until at about 7 mole percent yttria, a stable cubic solid solution phase results. As more yttria is added, up to about 55 mole percent, the lattice constant of the solution increases roughly according to Vegard's Law. Above about 55 mole percent, a second phase having the yttria structure appears. The appropriate amount of stabilizing oxide is that which is required to yield a single solid solution phase which is either cubic or tetragonal with a monoclinic-tetragonal transformation temperature below room temperature. The necessary information for each system is readily obtainable from phase diagrams. Suitable diagrams can be found in Duwez, Pol, Frank H. Brown, Jr. and Francis Odell, J. Electrochem. Soc. 98 356 (1951). Products containing up to 50 mole percent of scandia and the rare earth oxides and up to 55 mole percent yttria have been prepared.

The stabilized zirconia sols of our invention can be prepared by several alternate procedures. One method consists of coprecipitation of a mixed salt solution followed by peptization to a sol. The other method involves autoclaving together the active, previously-formed sols of zirconia and stabilizing oxide at an elevated temperature for a time sufficient to ensure interreaction of the sols.

The preferred method of preparation of the stabilized zirconia sols of our invention is the coprecipitation method. The first step of this process consists of preparing a mixed zirconium-stabilizer salt solution. Salts of monovalent acids are the preferred materials. We have found the chlorides and nitrates to be especially convenient. The coprecipitate is obtained by dripping the mixed salt solution into an excess of base with vigorous stirring. Ammonia is the preferred base though others can be used. The precipitate is then filtered from the basic solution and washed free of electrolytes with deionized water. The washed solids are slurried with enough deionized water to give a concentration of about 1 to 8 g./100 ml. The slurry is then peptized at a temperature between about 60 and 120° C. for at least ½ hour. The preferred conditions are two hours at 80° C.

The zirconia sols prepared by this method consist basically of cubic particles about 7 millimicrons in size which are associated into larger kinetic units. If desired, the sol particles can be separated from the dispersing medium by centrifugation, vacuum evaporation or azeotropic distillation.

The particles composing the sols of our invention are amorphous to X-rays. However, the dispersed phase, when separated by centrifugation and heated to about 400° C. for 6 hours, yields either a tetragonal or a cubic diffraction pattern, depending upon the amount of yttria present. In contrast, unstabilized zirconia sols or sol particles yield a mixture of monoclinic and metastable tetragonal zirconia when calcined at this same temperature.

The alternate method of preparing the sols of this invention consists of autoclaving together the reactive, previously-prepared sols of zirconia and stabilizing oxides. A reactive zirconia sol is prepared by removing anions from a soluble zirconium salt by ion exchange or electrodialysis. Reactive sols of the stabilizing oxides are most conveniently prepared by precipitating the hydroxide, washing and peptizing with acetic acid. The two reactive sols are mixed in the desired proportions and are heated for 1 to 10 hours at 100 to 150° C. Autoclaving for about 5 hours at about 120° C. gives consistently good results.

There is an upper limit in the total oxide concentration that will yield a sol by this method. The limit varies with the system. For example, in the zirconia-yttria system, the total oxide concentration should not exceed 1 g./100 ml. Above this limit, a clear gel is obtained as product. Of course, for applications which do not require discrete particles, such a gel can be used since it still represents an intimate association of zirconia with the stabilizing oxide. However, most applications now contemplated prefer that the material be present as discrete particles.

Electron microscopy has shown that the yttria-zirconia sols prepared by this autoclaving method consist primarily of aggregates of cubic subunits which average about 10 millimicrons on the side. Some of the subunits appear to have open centers while others are fragmented into smaller rod-like pieces. They are amorphous to X-rays when first prepared but convert readily to the tetragonal or cubic solid solution phase when separated by centrifuging and heated to about 400° C. for about 6 hours.

A number of analytical techniques have been used in evaluating our product. Electron micrographs and X-ray measurements were made by standard techniques. Solid solution compositions were assigned from cell constants according to the data of Duwez, Brown and Odell, J. Electrochem Soc. 98 356 (1951). The Scherrer method was used to assign crystallite size values from line broadening determinations at half-maximum intensity.

The specific conductance of the sol product was determined at 25° C. and 1 kilocycle using a standard conductivity bridge with a cell inserted in one arm. The cell constant was determined using a KCl solution of 0.01 normality (the specific conductance of which is obtained from conductivity tables) and the equation:

$$K = L_{KCl}R$$

where:
$K$ = cell constant in cm.$^{-1}$.
$R$ = bridge resistance in ohms.
$L$ = conductance in mho/cm. of the standard KCl solution.

The specific conductance, L, of the sol was obtained by measuring its resistance in the same cell and using the equation:

$$L_{sol} = K/R$$

where:
$K$ = cell constant.
$R$ = resistance in ohms.

Our invention will be further explained by the following specific but non-limiting examples.

EXAMPLE I

In this run, a zirconia-yttria sol was prepared by the coprecipitation method.

A mixed chloride solution was prepared by dissolving 12.7 grams of zirconyl chloride octahydrate in water, adding 16.6 milliliters of an yttrium chloride solution containing 16.0 g. $Y_2O_3$/100 ml. to the aqueous solution and finally diluting the mixture to 119 milliliters with deionized water. The chloride solution was dripped slowly into 31 milliliters of concentrated ammonia with vigorous stirring. (This amounted to a 100% excess of ammonia.) A hydrous zirconia-yttria coprecipitate was obtained.

The precipitate was filtered by suction, washed with deionized water to remove electrolytes, then slurried with enough water to give a total oxide concentration of about 5 g./100 ml. 7.5 milliliters of 3 normal nitric acid were added to lower the pH of the slurry from 9.1 to 6.0. Peptization was carried out by refluxing the slurry for 6 hours in the presence of the nitric acid.

The product sol was moderately opaque and scattered light. It settled slowly on standing but was readily dispersed by slight agitation. The pH of the final sol was 6.2 and the specific conductance $1.0 \times 10^{-2}$ mho/cm. Electron microscopy showed the dispersed phase to be of homogeneous composition and to consist of cubic, open-centered subunits about 7 millimicrons in width. These subunits were, in turn, aggregated into larger kinetic units.

The particles as prepared were amorphous to X-rays. After being separated from the dispersing medium and heated to 400° C. for 6 hours, the particles were re-examined by X-ray and found to consist of a single zirconia-yttria solid solution phase. The lattice constant was 5.148 A. indicating an yttria content in the final particles of 14 mole percent. Crystallite size was much below the 65 A. limit for assigning values.

EXAMPLE II

Another preparation of a zirconia-yttria sol was carried out in this run.

The coprecipitate was obtained just as described in Example I by dripping 119 milliliters of an aqueous solution containing 12.7 grams of zirconyl chloride octahydrate and 16.6 milliliters of an yttrium chloride solution containing 16.0 g. $Y_2O_3$/100 ml. into 31 milliliters of concentrated ammonia with vigorous stirring. A hydrous zirconia-yttria coprecipitate containing 23 mole percent $Y_2O_3$ was obtained.

The coprecipitate was filtered by suction and washed well with deionized water to remove electrolytes. It was then slurried with enough water to give a total oxide concentration of about 5 g./100 ml. One hundred milliliters of a strong cation exchange resin (Amberlite IR-120 produced by the Rohm and Haas Company, Philadelphia, Pa.) were stirred into the slurry. The resin was freshly converted to the hydrogen form by treatment with hydrochloric acid, followed by repeated washings with deionized water just prior to use. The addition of the resin lowered the pH of the slurry from 9.3 to 6.7. The system was heated to 80° C. and then allowed to cool, followed by stirring overnight in the presence of resin.

The product sol was opaque and very slow settling. It scattered light strongly. The final pH of the sol was 3.2 and its specific conductance was $4.5 \times 10^{-4}$ mho/cm.

The dispersed phase was shown by electron microscopy to be of homogeneous composition and to consist of cubic, open-centered subunits about 7 millimicrons in width. These sub-units were, in turn, loosely associated into larger kinetic units. The dispersed phase was separated from the dispersing medium by centrifuging, examined by X-ray and found to be amorphous.

The particles were then heated to 500° C. for 6 hours and re-examined by X-ray. A pattern corresponding to a zirconia-yttria solid solution was found. Its lattice constant was 5.097 A. According to the literature, this represents a composition of about 2 mole percent $Y_2O_3$. Crystallite size as deduced from line-broadening measurements was about 115 millimicrons. The reduction in yttria content from the original 23 mole percent in the system is due to the low pH environment during peptization. This example illustrates that even a very small amount of yttria is sufficient to stabilize zirconia by bringing the monoclinic-tetragonal transformation temperature to below room temperature even though the amount of yttria present is too small to form a cubic solid solution with zirconia.

EXAMPLE III

An unstabilized zirconia sol was prepared in order to compare its properties with those of the product of our invention.

One hundred fifty milliliters of a zirconyl chloride solution containing 5 g. $ZrO_2$/100 ml. were added to 31.9 ml. of concentrated ammonia. (This amounted to 100% excess of base.) The precipitate formed was filtered, washed free of electrolytes, then slurried in enough water to make 150 ml. The slurry was peptized by adding 130 ml. of drained cation exchange resin (Amberlite IR-120) which had been freshly converted to the acid form and heating the mixture to 80° C. for 2 hours.

The product sol was opaque and scattered light strongly. The pH of the final sol was 5.2 and its specific conductance $1.0 \times 10^{-5}$ mho/cm.

The sol particles were separated from the dispersing medium by centrifuging, heated to 975° C. for 6 hours, and then examined by X-ray. The X-ray diffraction pattern showed the particles to be a mixture of monoclinic and tetragonal zirconia with a mean crystallite size of about 130 A.

It is readily apparent that this material is inferior to that of our invention since on heating to higher temperatures, the monoclinic component will undergo a reversible transformation to the tetragonal accompanied by an undesirably large change in volume.

EXAMPLE IV

In this run an yttria stabilized zirconia sol was prepared using the autoclaving technique.

The reactive zirconia sol was prepared by electrodialysis of a zirconyl chloride solution. The reactive yttria sol was obtained by peptizing freshly precipitated and washed yttrium hydroxide with acetic acid.

The two sols were mixed so that the total oxide concentration of the mixture would be no more than 1 g./100 ml. 9.1 milliliters of yttria sol (5.0 g. $Y_2O_3$/100 ml.) and 24.9 grams of zirconia sol (3.0 g. $Zr_2O_3$/100 ml.) were mixed together and the final volume adjusted to 120 ml. with deionized water. Autoclaving for 5 hours at 120° C. yielded a slightly opalescent sol with a pH of 6.2 and a specific conductance of $2.9 \times 10^{-3}$ mho/cm.

The sol was shown by electron microscopy to be homogeneous in composition and to consist of particles which were aggregates of subunits. Most of the subunits were open-centered cubes, 10 millimicrons in width. Some were smaller, elongated fragments.

The particles were separated from the dispersing medium by centrifuging, and examined by X-ray without further heat treatment. The pattern displayed showed that the material was a single phase cubic zirconia-yttria solid solution with a crystallite size well below the 65 A. limit for assigning values. Lattice constant was 5.156 A. which indicates an yttria content of the final particles of about 17 mole percent.

It can be readily seen that our invention offers a simple and direct method for preparing highly stable zirconia in colloidal form.

What is claimed is:

1. A process for preparing a zirconia sol consisting of particles stabilized against the monoclinic-tetragonal phase transformation when particles are heated to a temperature above 350° C. which comprises adding a compound of a metal selected from the group consisting of scandium, yttrium and elements 62 to 71 of the periodic table in an amount sufficient to provide 1 to 50 mole percent of said metal oxide in said sol, in an aqueous medium, to a zirconium salt solution followed by heating to 60 to 120° C. for ½ to 4 hours to complete the stabilized sol preparation.

2. The process according to claim 1 which comprises:
   (a) Preparing an aqueous zirconium salt solution,
   (b) Mixing said solution with an aqueous solution of a salt of a metal selected from the group consisting of scandium, yttrium and elements 62 through 71 of the periodic table in an amount sufficient to provide 1 to 50 mole percent of said metal oxide in the final sol,
   (c) Coprecipitating the zirconia and metal oxide with a base,
   (d) Removing electrolytes from the precipitate,
   (e) Slurrying the solids in water to prepare a slurry containing 10 to 80 grams per liter of solids,
   (f) Adjusting the pH to a pH of 3.5 to 7 using a cation exchange resin in the hydrogen form,
   (g) Peptizing by heating said slurry to 60 to 120° C. for ½ hour to 4 hours and
   (h) Recovering the product sol.

3. The process according to claim 2 wherein the zirconium and metal salt solutions are prepared from salts of monovalent acids, the basic solution is ammonium hydroxide, and the electrolytes are removed by filtration and washing with deionized water.

4. The process according to claim 2 wherein a zirconium salt solution is mixed with a yttrium chloride solution, the solution is added to an ammonium hydroxide solution equal to an excess of 100 percent of the amount required to complete the coprecipitation and the peptization is completed by heating for ½ to 4 hours at reflux temperature.

5. A process for preparing a zirconia sol composed of particles stabilized against the monoclinic-tetragonal phase transformation when said particles are heated to a temperature above 350° C. which comprises:
   (a) Preparing a reactive zirconia sol,
   (b) Preparing a sol of a metal oxide selected from the group consisting of scandia, yttria and oxides of elements 62 to 71 of the periodic table,
   (c) Mixing the sols in a proportion that the product contains 1 to 50 mole percent of said metal oxide and autoclaving at a temperature of about 100 to 150° C. for 1 to 10 hours, and
   (d) Recovering the product sol.

6. The process according to claim 5 wherein the metal oxide sol is a yttria sol.

References Cited by the Examiner
UNITED STATES PATENTS
1,470,195  10/1923  DeRoiboul _____ 106—57 XR ALBERT T. MEYERS, *Primary Examiner.*

JULIUS GREENWALD, *Examiner.*

R. D. LOVERING, *Assistant Examiner.*